US012614291B2

(12) United States Patent
Chambers et al.

(10) Patent No.: US 12,614,291 B2
(45) Date of Patent: Apr. 28, 2026

(54) COREGISTRATION OF GROUND PENETRATING RADAR IMAGES

(71) Applicant: Lawrence Livermore National Security, LLC, Livermore, CA (US)

(72) Inventors: David Chambers, Livermore, CA (US); Jeffrey Edward Mast, Loveland, CO (US)

(73) Assignees: Lawrence Livermore National Security, LLC, Livermore, CA (US); Teres Technologies, Inc., Loveland, CO (US)

( * ) Notice: Subject to any disclaimer, the term of this patent is extended or adjusted under 35 U.S.C. 154(b) by 358 days.

(21) Appl. No.: 18/296,939

(22) Filed: Apr. 6, 2023

(65) Prior Publication Data

US 2024/0338833 A1 Oct. 10, 2024

(51) Int. Cl.
| | |
|---|---|
| *G06T 7/30* | (2017.01) |
| *G06T 5/40* | (2006.01) |
| *G06T 5/50* | (2006.01) |
| *G06V 10/44* | (2022.01) |
| *G06V 10/46* | (2022.01) |
| *G06V 10/50* | (2022.01) |
| *G06V 10/60* | (2022.01) |
| *G06V 10/74* | (2022.01) |

(52) U.S. Cl.
CPC ................. *G06T 7/30* (2017.01); *G06T 5/40* (2013.01); *G06T 5/50* (2013.01); *G06V 10/44* (2022.01); *G06V 10/462* (2022.01); *G06V 10/50* (2022.01); *G06V 10/60* (2022.01); *G06V 10/761* (2022.01); *G06T 2207/10044* (2013.01)

(58) Field of Classification Search
CPC .... G06T 7/30; G06T 5/40; G06T 5/50; G06T 2207/10044; G06V 10/462; G06V 10/761; G06V 10/60; G06V 10/50; G06V 10/44
See application file for complete search history.

(56) References Cited

U.S. PATENT DOCUMENTS

| | | | |
|---|---|---|---|
| 8,482,452 | B2 | 7/2013 | Chambers et al. |
| 8,508,403 | B2 | 8/2013 | Paglieroni et al. |
| 8,618,976 | B2 | 12/2013 | Paglieroni et al. |
| 8,659,467 | B1 | 2/2014 | Chambers et al. |
| 8,681,036 | B2 | 3/2014 | Beer et al. |
| 8,711,028 | B2 | 4/2014 | Paglieroni et al. |
| 8,717,223 | B2 | 5/2014 | Chambers et al. |
| 8,730,085 | B2 | 5/2014 | Paglieroni et al. |
| 8,754,802 | B2 | 6/2014 | Paglieroni et al. |
| 8,766,845 | B2 | 7/2014 | Hallquist et al. |

(Continued)

*Primary Examiner* — Stephen G Sherman
(74) *Attorney, Agent, or Firm* — Volpe Koenig

(57) ABSTRACT

A method of coregistering images is disclosed. Two dimensional images are first preprocessed, including clipping values in each image to a specified standard value range, and then applying a local equalization technique to the clipped images. Feature extraction is then performed to identify one or more features in the images. One or more of the extracted features are then matched between images to determine a degree of overlap between the images and a relationship between image coordinates of the images. The images are then transformed to a common coordinate system based on the degree of overlap and the relationship between their image coordinates. The images are then combined to form a single image.

30 Claims, 7 Drawing Sheets

(56)              References Cited

U.S. PATENT DOCUMENTS

| | | | |
|---|---|---|---|
| 8,854,248 | B2 | 10/2014 | Paglieroni et al. |
| 8,854,249 | B2 | 10/2014 | Paglieroni et al. |
| 9,239,382 | B2 | 1/2016 | Paglieroni et al. |
| 11,676,366 | B1 * | 6/2023 | Cooke .................... G06V 10/60 |
| | | | 382/154 |
| 2012/0093433 | A1 * | 4/2012 | Gupta ........................ G06T 5/90 |
| | | | 382/260 |
| 2013/0050008 | A1 * | 2/2013 | Atkins .................... G01S 13/89 |
| | | | 342/22 |
| 2017/0278258 | A1 * | 9/2017 | Kurz .................... G06V 10/462 |
| 2018/0158199 | A1 * | 6/2018 | Wang ........................ G06T 3/18 |
| 2018/0218502 | A1 * | 8/2018 | Golden ..................... G06T 7/11 |
| 2021/0304361 | A1 * | 9/2021 | Huemmer .............. G06V 10/50 |
| 2023/0351721 | A1 * | 11/2023 | Domanski ............ G06V 10/449 |

* cited by examiner

300

304

Preprocess source blocks

Convert images to standardized form
402

Clip images to specified pixel range
404

Apply local equalization to clipped images
406

COREGISTRATION OF GROUND PENETRATING RADAR IMAGES

STATEMENT REGARDING FEDERALLY SPONSORED RESEARCH

This invention was made with Government support under Contract No. DE-AC52-07NA27344 awarded by the United States Department of Energy. The Government has certain rights in the invention.

FIELD

The present invention generally pertains to image processing techniques, and more particularly, to a technique for spatially coregistering a set of Ground Penetrating Radar (GPR) images.

BACKGROUND

GPR imaging systems are commonly used to discover and identify underground features, such as buried landmines, archeological sites, geological features, etc. GPR systems can be mounted on ground vehicles or on aerial platforms. GPR imaging systems mounted on aerial platforms may sweep over a target area multiple times in a single acquisition run. The acquired images generally are sequences of frames, each of which is a two-dimensional slice image of an underground area under a linear radar array. The plane of the slice image is perpendicular to the local ground level and includes the radar array. The aerial platform generally moves in a direction normal to the array, sweeping an area whose width is approximately equal to the length of the array length.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
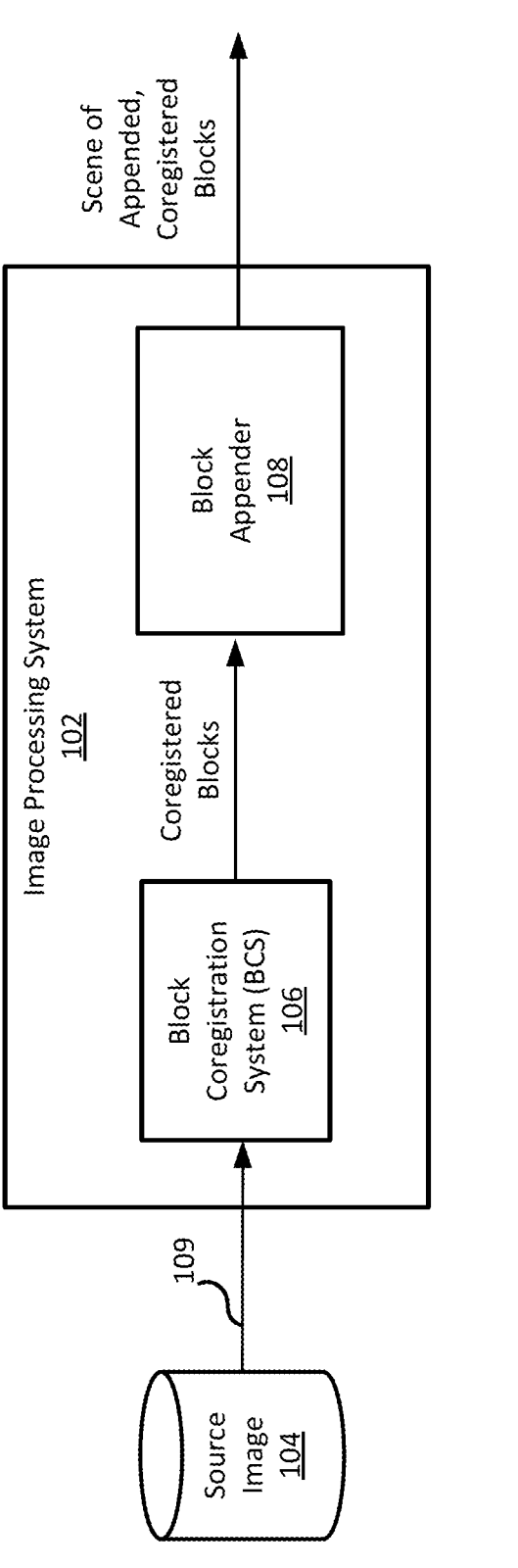
FIG. 1 illustrates an example of an image processing system that can implement the image coregistration technique introduced here.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Unlike ground vehicle based GPR systems, aerial GPR systems are relatively unconstrained in their ground path and direction. Such a system can pass over a given area multiple times from multiple directions. Images of an area can be significantly enhanced if images from each pass can be coherently combined. Such combination could enhance weak features by reducing background noise. A significant challenge associated with coherently combining images from different passes, however, is coregistering the images obtained from each pass, particularly if a pass only partially covers a given area. Coregistration is the process of accurately determining the correct relative spatial positioning and orientation of two images whose subject matter at least partially overlaps.

One way to combine images from multiple passes is to use navigation information from sensors on the platform, such as inertial measurement units (IMUs) and global positioning system (GPS) receivers. However, these sensors may not be sufficiently precise and are subject to calibration errors and (in the case of GPS) interruptions in signal reception. It would be more direct to identify common features in the images themselves to calculate the platform position and pose for each pass. This could be done by comparing segments of three-dimensional (3D) image blocks, two-dimensional (2d) slices through the 3D blocks, or 2D projections through the 3D blocks.

Introduced here, therefore, are an improved system and technique for coregistering images, such as images captured by an aerial GPR system. Note, however, that the system and technique introduced here are not limited in applicability to GPR images, and can be applied to coregister essentially any kind of images. In an embodiment of the technique introduced herein, 2D images are first preprocessed, which can include converting the images to a standardized form, clipping values in each image to a specified standard value range, and then applying a local equalization technique to the clipped images. Feature extraction is then performed to identify one or more features in the preprocessed images. One or more of the extracted features are then matched between two or more images to determine a degree of overlap between the images and a relationship between image coordinates of the images. Images containing matching feature(s) are then transformed to a common coordinate system based on the degree of overlap and the relationship between their image coordinates. The images containing the matching feature(s) are then combined to form a single image. In effect, images are "stitched" together to form larger images. Further details of at least one embodiment of the technique introduced here will be apparent from the description that follows.

FIG. 1 shows an example of an image processing system 102 that can implement the image coregistration technique introduced here. The image processing system 102 includes two main components: a block coregistration system (BCS) 106 and a block appender 108. The terms "block" or "image block" as used herein refers to a 2D "slice" of a 3D image, i.e., collection of adjacent pixels in a single plane. It will be recognized that an image block can itself also be considered an image. The BCS 106 accesses, either directly or indirectly, image data collectively forming a 3D source image that (in at least one possible application) has been captured by, for example, an aerial GPR system. The image data 109 input to the BCS 106 can be 3D images, 2D slices of 3D images, or 2D projections. To facilitate explanation, it is assumed henceforth in this description that the images input to the BCS 106 are 2D top projections (i.e., bird's eye views), where each such top projection (image block) is a strip of a larger area covered by the GPR system. The main purpose of the BCS 106 is to accurately and precisely coregister (spatially align) individual image blocks by matching common features depicted in them. The block appender 108 then appends coregistered blocks together to form a larger scene. In some instances, the BCS 106 may coregister an image block to another image block that has already been appended to the larger scene.

Figure 2:
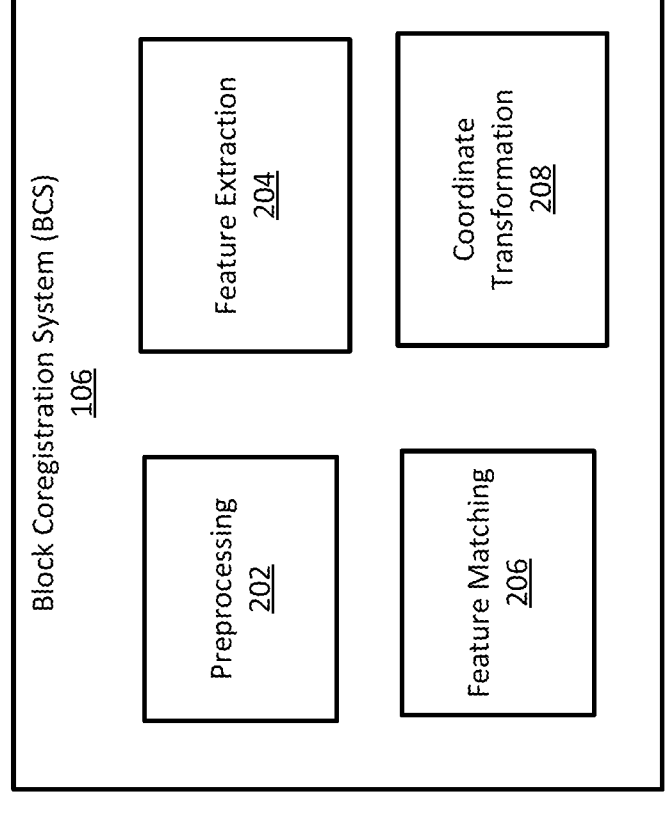
FIG. 2 illustrates an example of the components of the block coregistration system (BCS).

FIG. 2 illustrates an example of the components of the BCS 106 in at least one embodiment. As shown, the BCS 106 includes a preprocessing module 202, a feature extraction module 204, a feature matching module 206 and a coordinate transformation module 208. The purpose of the preprocessing module 202 is to process the input image blocks in a manner that facilitates more accurate and precise coregistration of the image blocks. In at least one embodiment, the preprocessing performed by preprocessing module 202 includes converting image blocks to a standardized form, clipping the image blocks to a specified pixel range, and then applying a local equalization to the image blocks to eliminate strong variations in background or amplitude. Further details of the preprocessing are described below.

The purpose of the feature extraction module 204 is to identify features (as distinguished from background or noise) in the preprocessed image blocks. The purpose of the feature matching module 206 is to match common features between two or more image blocks, i.e., to determine when a feature at least partially depicted in two or more image blocks is the same feature. The purpose of the coordinate transformation module 206 is to transform image blocks that have one or more features in common, to the same coordinate system. Further details regarding the functionality of these modules are also described below.

Figure 3:
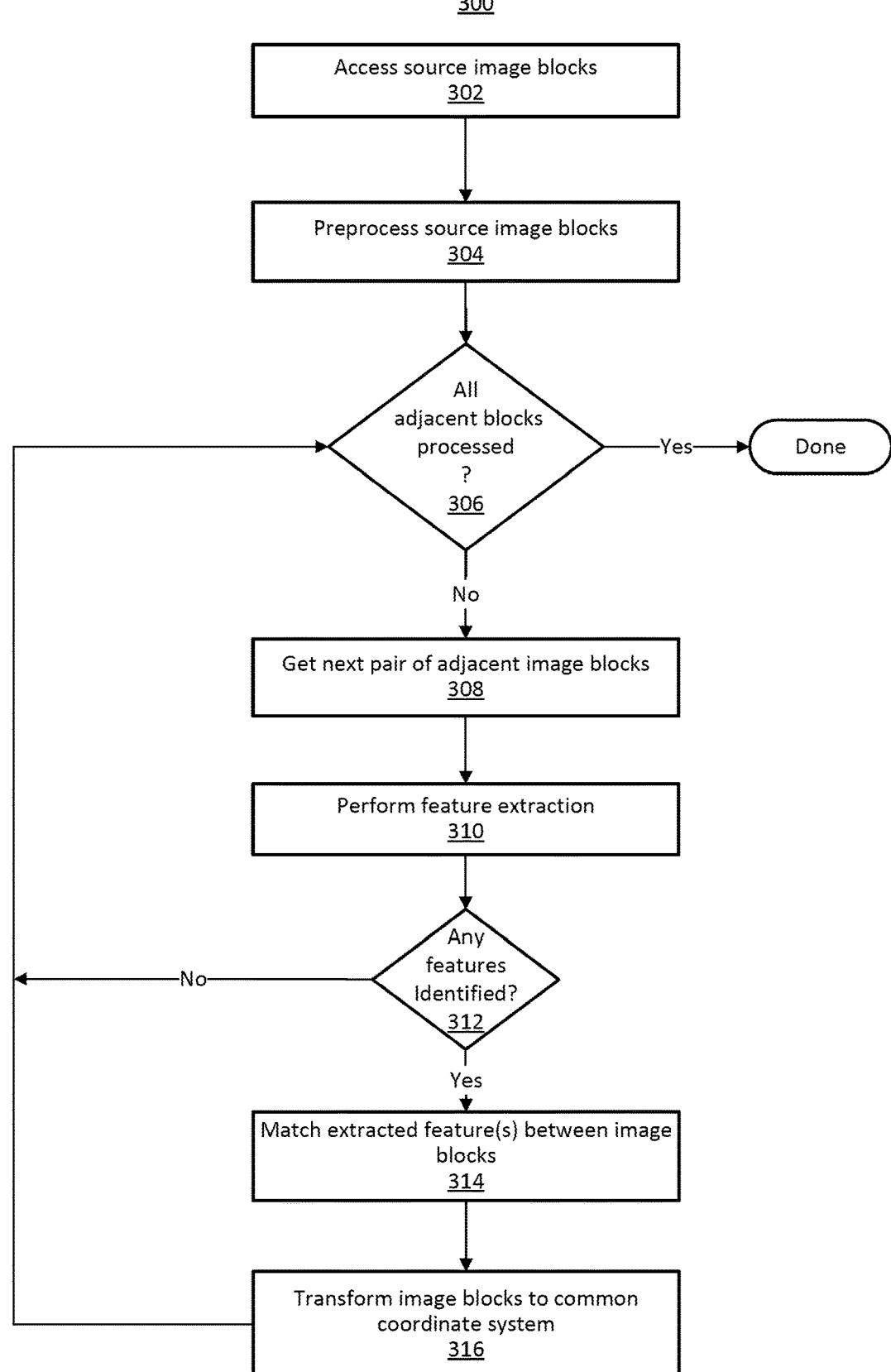
FIG. 3 illustrates an example of a block coregistration process.

FIG. 3 illustrates an example of a process 300 that can be performed by the BCS 106, to coregister image blocks in accordance with the technique introduced here. Initially, at step 302 the process 300 accesses source image blocks. The source image blocks can be 3D images, 2D slices of a 3D image, or 2D projections of a 3D image. Here, to facilitate description it is assumed that the image blocks are 2D top projections of a 3D image. Further, the BCS 106 may access some or all of the required source image blocks at once (i.e., as a batch), or on an as needed basis, or in any other convenient manner. At step 304 the BCS 106 preprocesses the source image blocks. In some embodiments, all of the accessed source image blocks may be preprocessed in a batch. In other embodiments, source image blocks may be preprocessed in smaller groups, for example, as adjacent pairs that will be compared for coregistration. Further details of the preprocessing are described below.

Next, if all (spatially) adjacent image blocks have been processed, the process 300 ends. Otherwise, the process 300 proceeds to step 308. Image blocks may be determined to be adjacent or not adjacent in any known or convenient manner. For example, the BCS 106 may use GPS data associated with the image blocks and/or other spatial localization information from other types of sensors to identify image blocks that are adjacent. In step 308, the process 300 gets the next pair of adjacent image blocks, and at step 310 the process 300 performs feature extraction to attempt to identify features in the image blocks obtained in step 308.

Feature extraction for each image block can be performed by using any of various possible techniques. For example, the histogram of oriented gradients (HOG) technique can be used to extract statistical measures of the local gradients of an image block. Other possible techniques include use of edge orientation histograms, scale-invariant feature transform descriptors, and edge histogram descriptors. Features extracted from image blocks can include both feature descriptor vectors and locations.

In some embodiments, a known feature point and description algorithm may be used for feature extraction, such as BRISK, FREAK or FLANN. The BRISK algorithm is a feature point detection and description algorithm with scale invariance and rotation invariance. BRISK constructs the feature descriptor of the local image through the gray scale relationship of random point pairs in the neighborhood of the local image and obtains the binary feature descriptor. In comparison to a traditional algorithm, the matching speed of BRISK is faster and the storage memory is lower, however, the robustness of BRISK is reduced. The Fast Retina Keypoint (FREAK) feature extractor is a keypoint descriptor inspired by the human visual system and more precisely the retina. A cascade of binary strings is computed by efficiently comparing image intensities over a retinal sampling pattern. The Fast Library for Approximate Nearest Neighbors (FLANN) contains a collection of algorithms optimized for fast nearest neighbor search in large datasets and for high dimensional features. It works faster than BFMatcher for large datasets.

If no feature is identified (extracted) (step 312), the process loops back to step 306. If any feature is identified (extracted) (step 312), then at step 314, the process 300 matches the extracted features that are common, if any, between the image blocks currently being processed. The purpose of this step is to determine the degree of overlap (if any) between the image blocks currently being processed and the relationship between their spatial coordinates. Correspondence between feature descriptors can be identified, for example, by minimizing the difference between descriptor vectors. This operation can take the form of minimizing the Euclidean distance between descriptor vectors (e.g., L2 norm) or the absolute value norm. It is likely that only a subset of features between any two image blocks will have matches, so it may be desirable to test different groups of image blocks to find the best correspondence.

Referring again to FIG. 3, after feature matching, the process 300 at step 316 transforms any matched image blocks (i.e., image blocks that contains corresponding features) to a common coordinate system. This step takes the location of a matched feature in one image block and changes it to the coordinates of the corresponding feature in the other image block. The result of step 316 is two (or more) image blocks that are coregistered. The overlapping portions of the image blocks can then be combined (e.g., summed) by the block appender 108 to form a single image of the target region, i.e., a scene. Following step 316, the process loops back to step 306.

Figure 6:
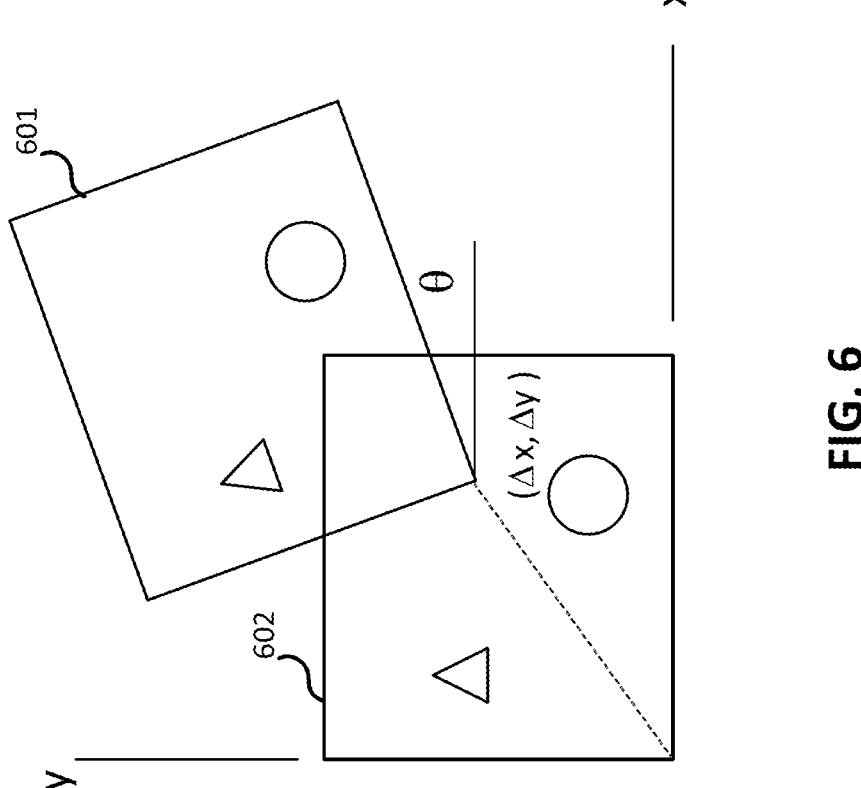
FIG. 6 schematically illustrates an example of image coregistration.

FIG. 6 schematically illustrates a simplified example of image coregistration. A new image 601 provided from a GPR system needs to be coregistered with an older image 602. In this example each image contains two features, a triangle and circle. The triangle can be described by the (x,y) coordinates of its vertices. The circle is described by its radius and (x,y) coordinates of its center. Therefore, the parameters that describe the features in each image can be represented as a feature vector containing nine values: the coordinates of three vertices for each of two triangles, and the center coordinates and radius of the circle. Let $g_r$ be the feature vector for the new image 601 and $g_b$ be the feature vector for the older image 602. The relationship between the feature vectors is a function of the displacement vector ($\Delta$x, $\Delta$y) and orientation angle $\theta$, i.e. $g_r = f(g_b; \Delta x, \Delta y, \theta)$. The values for the displacement vector and orientation can be obtained by minimizing the mean-square error between the measured g and the function $f(g_b; \Delta x, \Delta y, \theta)$. Once these are obtained, the new image 601 can be coregistered to the older image 602 and combined with it.

Figure 4:
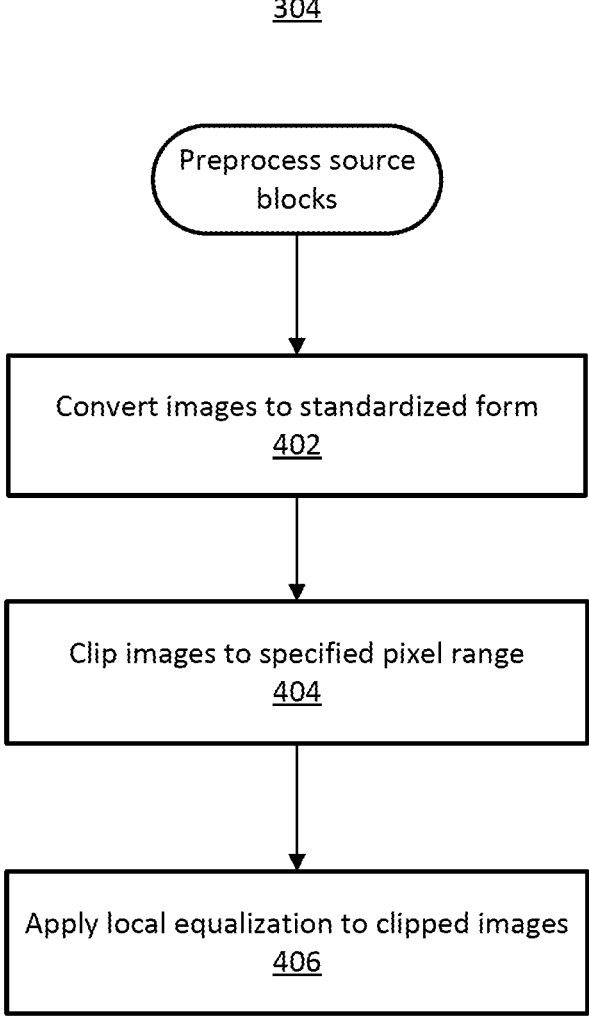
FIG. 4 illustrates an example of the step of preprocessing of image blocks in greater detail.

FIG. 4 illustrates an example of the preprocessing of image blocks in step 304. Initially, the preprocessing converts the image blocks to a standardized form at step 402. This step equalizes the range of pixel values between the image blocks, enabling them to be compared in the subsequent matching step. In at least some embodiments, this step converts the image blocks to a common brightness scale. The standardization step 402 can involve calculating the mean and variance of pixel values in the image block, then subtracting the mean calculated for that image block from each pixel value to produce a set of intermediate pixel values, and then dividing each intermediate pixel value by the square root of the variance for that image block. The resulting distribution of standardized pixel values will have zero mean and unit variance. Standardization can be applied over the entire image block, or layer by layer if the mean and variance are strong functions of depth. It may also be desirable or convenient to transform the pixel values to a decibel (dB) scale prior to standardization.

Next, at step 404 the preprocessing clips the image blocks to a specified pixel (intensity) range. This step can be considered a form of course registration. The lower limit in the specified pixel range is preferably chosen to include some amount of random background fluctuations. The choice of upper limit of the specified pixel range is less sensitive and could be, for example, the maximum value over both image blocks. The image blocks are clipped by setting all pixel values less than the minimum to the minimum value and setting all pixel values greater than the maximum to the maximum.

Figure 7:
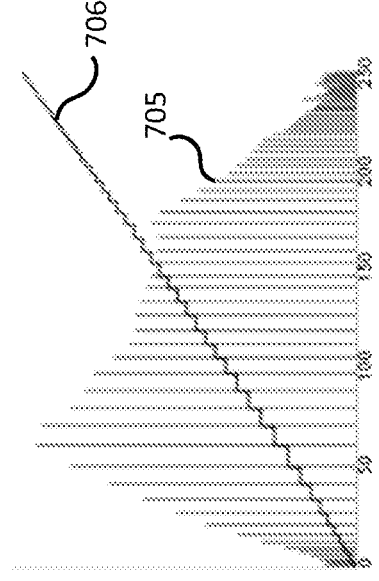
FIG. 7 schematically illustrates an example of local histogram equalization.
Figure 7:
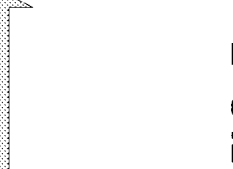
Figure 7:
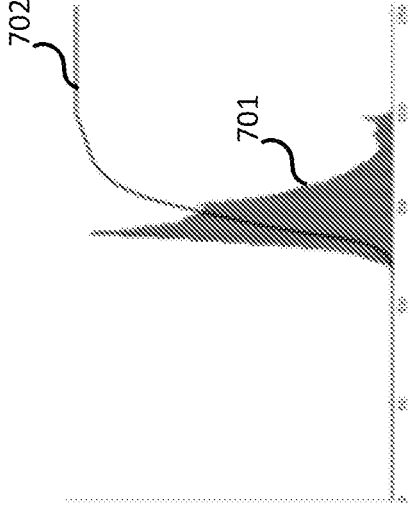

Next, at step 406 the preprocessing applies a local equalization technique to the clipped image blocks to eliminate any remaining strong variations in background or amplitude (what is considered a "strong" variation in this context is implementation-specific). The local equalization technique provides a more complex feature domain, which makes the subsequent image block matching process more sensitive. It allows for areas of lower local contrast to gain a higher contrast, by effectively spreading out the highly populated intensity values which are used to degrade image contrast. The equalization technique is "local" in the sense that it is performed over regions that are smaller than an image block, such as a 5×5 or 10×10 pixel regions. An example of a local equalization technique that may be used in this step is common technique is local histogram equalization, in which image values are adjusted within local patches to have a flat histogram. This technique is illustrated in FIG. 7. The left image shows an example of a histogram 701 and corresponding cumulative histogram 702 for an example image (not shown) prior to applying equalization, while the right image shows the resulting histogram 705 and corresponding cumulative histogram 706 after applying equalization.

Figure 5:
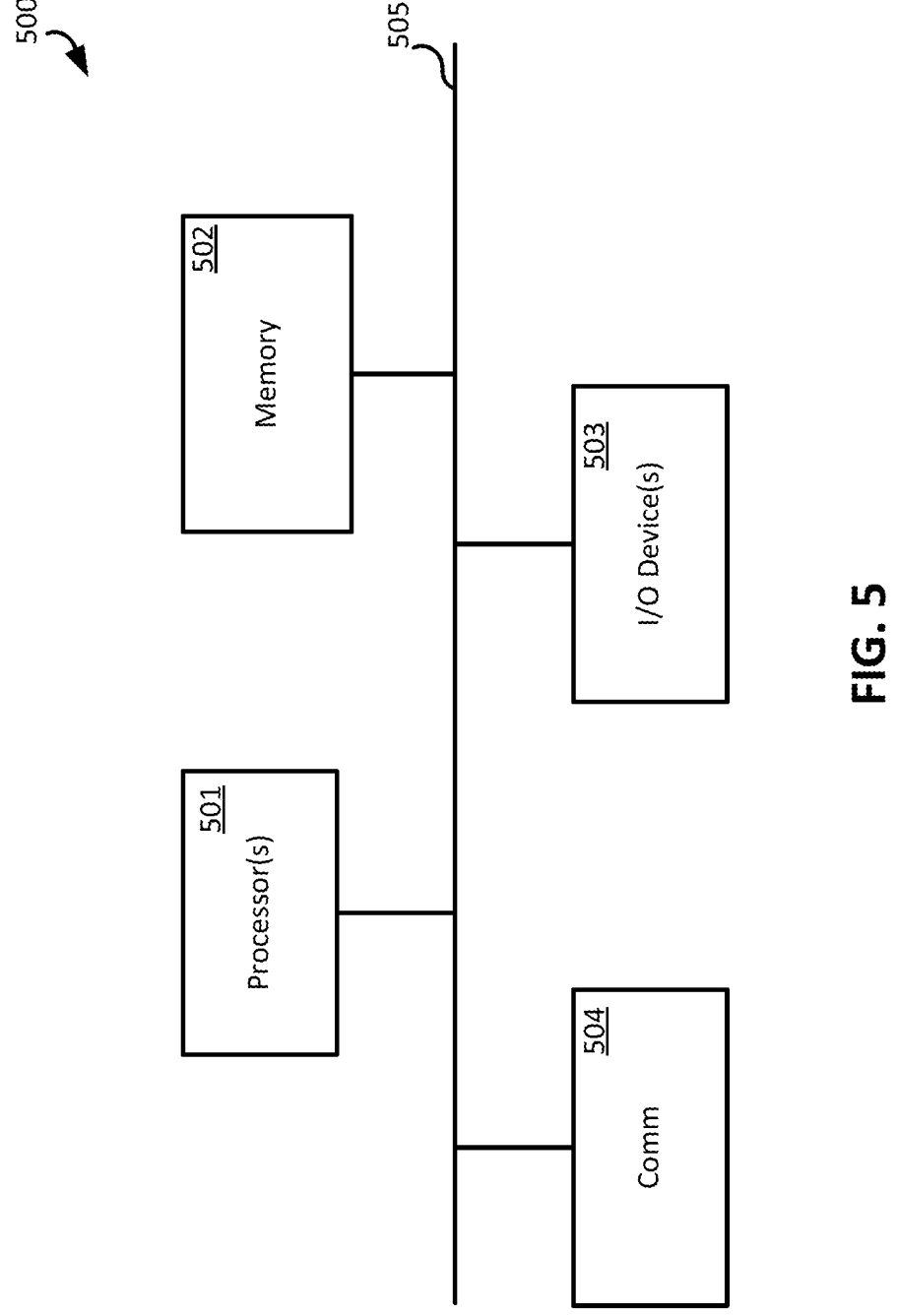
FIG. 5 is a block diagram illustrating an example of a computer system in which at least some aspects of the technique introduced here can be implemented.

FIG. 5 is a block diagram illustrating an example of a computer system 500 in which at least some aspects of the technique introduced here can be implemented, including, for example, the image block coregistration and the appending of matched image blocks to form a larger scene. The computer system 500 includes one or more processors 501, one or more memories 502, one or more input/output (I/O) devices 503, and one or more communication interfaces 504, all connected to each other through an interconnect 505. The processor(s) 501 control the overall operation of the computer system 100, including controlling its constituent components. The processor(s) 501 may be or include one or more conventional microprocessors, programmable logic devices (PLDs), field programmable gate arrays (FPGAs), application-specific integrated circuits (ASICs), etc. The one or more memories 502 store data and executable instructions (e.g., software and/or firmware), which may include software and/or firmware for performing the techniques introduced above. The one or more memories 502 may be or include any of various forms of random access memory (RAM), read-only memory (ROM), volatile memory, non-volatile memory, or any combination thereof. For example, the one or more memories 502 may be or include dynamic RAM (DRAM), static RAM (SDRAM), flash memory, one or more disk-based hard drives, etc. The I/O devices 503 provide access to the computer system 500 by human user, and may be or include, for example, a display monitor, audio speaker, keyboard, touch screen, mouse, microphone, trackball, etc. The communications interface 504 enables the computer system 500 to communicate with one or more external devices (e.g., one or more servers and/or clients of the computer system 500) via a network connection and/or direct connection. The communications interface 504 may be or include, for example, a Wi-Fi adapter, Bluetooth adapter, Ethernet adapter, Universal Serial Bus (USB) adapter, or the like. The interconnect 505 may be or include, for example, one or more buses, bridges or adapters, such as a system bus, peripheral component interconnect (PCI) bus, PCI extended (PCI-X) bus, USB, or the like.

Unless contrary to physical possibility, it is envisioned that (i) the methods/steps described herein may be performed in any sequence and/or in any combination, and that (ii) the components of respective embodiments may be combined in any manner.

The machine-implemented computational and control operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
accessing a first plurality of images; and
applying a coregistration process to a second plurality of images in the first plurality of images, the coregistration process including:
converting the second plurality of images to a specified standard form, by:
for each image of the second plurality of images, computing a mean and a variance of pixel values in the image; and
for each pixel value in each image of the second plurality of images, subtracting the mean computed for that image from each pixel value in the image to produce an intermediate pixel value, and dividing each intermediate pixel value by a square root of the variance computed for that image to produce a standardized pixel value;
preprocessing the second plurality of images, wherein the preprocessing includes clipping values in each image of the second plurality of images to a specified standard value range, to produce a plurality of clipped images; and applying a local equalization technique to the plurality of clipped images;
performing a feature extraction to identify a feature in each image of the plurality of clipped images;
matching the feature between each image of the plurality of clipped images, to determine a degree of overlap between the images in the second plurality of images and a relationship between image coordinates of the images in the second plurality of images;
transforming the second plurality of images to a common coordinate system based on the degree of overlap and the relationship between the image coordinates of the second plurality of images; and
combining the second plurality of images to form a single image.

2. The method of claim 1, wherein each of the first plurality of images is a two-dimensional subset or projection of a three-dimensional image.

3. The method of claim 1, wherein the local equalization technique comprises a local histogram equalization in which image values are adjusted within local regions to have a flat histogram.

4. The method of claim 1, wherein the preprocessing further includes, prior to the clipping values, converting the second plurality of images to a specified standard form, by converting the second plurality of images to a common brightness scale.

5. The method of claim 1, wherein the combining the second plurality of images comprises summing overlapping portions of the images.

6. The method of claim 1, wherein the feature comprises a feature descriptor vector and a location.

7. The method of claim 1, wherein the matching a common feature present in each image of the plurality of clipped images comprises minimizing a distance between feature descriptor vectors between images.

8. The method of claim 1, wherein the feature extraction comprises a histogram of oriented gradients (HOG) technique.

9. The method of claim 1, wherein the feature extraction comprises using at least one of:
an edge oriented histogram;
scale invariant feature transform descriptors; or
edge histogram descriptors.

10. The method of claim 1, wherein the first plurality of images are ground penetrating radar (GPR) images.

11. A computer system comprising:
one or more processor; and
one or more memories coupled to the one or more processors and storing instructions, execution of which by the one or more processors causes the computer system to:
access a first plurality of images acquired by a ground penetrating radar (GPR) system; and
apply a coregistration process to a second plurality of images in the first plurality of images, the coregistration process including:
preprocessing the second plurality of images, wherein the preprocessing includes
converting the second plurality of images to a specified standard form, by:
for each image of the second plurality of images, computing a mean and a variance of pixel values in the image; and
for each pixel value in each image of the second plurality of images, subtracting the mean computed for that image from each pixel value in the image to produce an intermediate pixel value, and dividing each intermediate pixel value by a square root of the variance computed for that image to produce a standardized pixel value;
clipping values in each image of the second plurality of images to a specified standard value range, to produce a plurality of clipped images; and
applying a local equalization technique to the plurality of clipped images;
performing a feature extraction to identify a feature in each image of the plurality of clipped images;
matching the feature between each image of the plurality of clipped images, to determine a degree of overlap between the images in the second plurality of images and a relationship between image coordinates of the images in the second plurality of images;
transforming the second plurality of images to a common coordinate system based on the degree of overlap and the relationship between the image coordinates of the second plurality of images; and
combining the second plurality of images to form a single image.

12. The computer system of claim 11, wherein each of the first plurality of images is a two-dimensional subset or projection of a three-dimensional image.

13. The computer system of claim 11, wherein the local equalization technique comprises a local histogram equalization in which image values are adjusted within local regions to have a flat histogram.

14. The computer system of claim 11, wherein the preprocessing further includes, prior to the clipping values, converting the second plurality of images to a specified standard form, by converting the second plurality of images to a common brightness scale.

15. The computer system of claim 11, wherein the combining the second plurality of images comprises summing overlapping portions of the images.

16. The computer system of claim 11, wherein the feature comprises a feature descriptor vector and a location.

17. The computer system of claim 11, wherein the matching a common feature present in each image of the plurality of clipped images comprises minimizing a distance between feature descriptor vectors between images.

18. The computer system of claim 11, wherein the feature extraction comprises a histogram of oriented gradients (HOG) technique.

19. The computer system of claim 11, wherein the feature extraction comprises using at least one of:

an edge oriented histogram;

scale invariant feature transform descriptors; or edge histogram descriptors.

20. The computer system of claim 11, wherein the first plurality of images have been acquired by use of a linear GPR array.

21. A non-transitory machine-readable storage medium storing instructions, execution of which by one or more processors in a processing system causes the processing system to perform a process comprising:

accessing a first plurality of images acquired by a ground penetrating radar (GPR) system; and applying a coregistration process to a second plurality of images in the first plurality of images, the coregistration process including:

converting the second plurality of images to a specified standard form, by:

for each image of the second plurality of images, computing a mean and a variance of pixel values in the image; and for each pixel value in each image of the second plurality of images, subtracting the mean computed for that image from each pixel value in the image to produce an intermediate pixel value, and dividing each intermediate pixel value by a square root of the variance computed for that image to produce a standardized pixel value;

preprocessing the second plurality of images, wherein the preprocessing includes clipping values in each image of the second plurality of images to a specified standard value range, to produce a plurality of clipped images; and applying a local equalization technique to the plurality of clipped images;

performing a feature extraction to identify a feature in each image of the plurality of clipped images;

matching the feature between each image of the plurality of clipped images, to determine a degree of overlap between the images in the second plurality of images and a relationship between image coordinates of the images in the second plurality of images;

transforming the second plurality of images to a common coordinate system based on the degree of overlap and the relationship between the image coordinates of the second plurality of images; and combining the second plurality of images to form a single image.

22. The non-transitory machine-readable storage medium of claim 21, wherein each of the first plurality of images is a two-dimensional subset or projection of a three-dimensional image.

23. The non-transitory machine-readable storage medium of claim 21, wherein the local equalization technique comprises a local histogram equalization in which image values are adjusted within local regions to have a flat histogram.

24. The non-transitory machine-readable storage medium of claim 21, wherein the preprocessing further includes, prior to the clipping values, converting the second plurality of images to a specified standard form, by converting the second plurality of images to a common brightness scale.

25. The non-transitory machine-readable storage medium of claim 21, wherein the combining the second plurality of images comprises summing overlapping portions of the images.

26. The non-transitory machine-readable storage medium of claim 21, wherein the feature comprises a feature descriptor vector and a location.

27. The non-transitory machine-readable storage medium of claim 21, wherein the matching a common feature present in each image of the plurality of clipped images comprises minimizing a distance between feature descriptor vectors between images.

28. The non-transitory machine-readable storage medium of claim 21, wherein the feature extraction comprises a histogram of oriented gradients (HOG) technique.

29. The non-transitory machine-readable storage medium of claim 21, wherein the feature extraction comprises using at least one of:

an edge oriented histogram;

scale invariant feature transform descriptors; or edge histogram descriptors.

30. The non-transitory machine-readable storage medium of claim 21, wherein the first plurality of images have been acquired by use of a linear GPR array.

* * * * *